(12) United States Patent
Clontz, II et al.

(10) Patent No.: US 11,792,592 B2
(45) Date of Patent: *Oct. 17, 2023

(54) METHODS OF CONTROLLING A DIGITAL DISPLAY BASED ON SENSOR DATA, AND RELATED SYSTEMS

(71) Applicant: DUKE ENERGY CORPORATION, Charlotte, NC (US)

(72) Inventors: Norvin Clontz, II, Charlotte, NC (US); James Douglas Cleveland, Cornelius, NC (US); Steven Patrick Hinkel, California, KY (US)

(73) Assignee: DUKE ENERGY CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,054

(22) Filed: Jul. 1, 2022

(65) Prior Publication Data

US 2022/0337966 A1 Oct. 20, 2022

Related U.S. Application Data

(63) Continuation of application No. 17/112,025, filed on Dec. 4, 2020, now Pat. No. 11,412,338.

(Continued)

(51) Int. Cl.
*H04R 5/00* (2006.01)
*H04S 5/02* (2006.01)
(Continued)

(52) U.S. Cl.
CPC ............... *H04S 5/02* (2013.01); *G08G 1/005* (2013.01); *H04L 67/12* (2013.01); *H04R 5/04* (2013.01); *H04S 7/304* (2013.01); *H04S 2420/01* (2013.01)

(58) Field of Classification Search
CPC ....... H04S 5/02; H04S 2420/01; G08G 1/005; H04L 67/12; H04R 5/04
(Continued)

(56) References Cited

U.S. PATENT DOCUMENTS 11,412,338 B2 * 8/2022 Clontz, II ................ H04R 3/00
2015/0294431 A1 10/2015 Fiorucci et al.
(Continued)

OTHER PUBLICATIONS

Ayre, James "AT&T's Current CityIQ Sensors To Be Installed Around The US (Traffic Monitoring, Gunshot Detection, Air Quality, Weather, Etc.)" Clean Technica (Mar. 7, 2017).
(Continued)

*Primary Examiner* — Ammar T Hamid
(74) *Attorney, Agent, or Firm* — Myers Bigel, P.A.

(57) ABSTRACT

Methods of operating a system of nodes are provided. A method of operating first and second nodes that are in a system of nodes includes processing first data from a first plurality of sensors of the first node. The method includes controlling a first digital display of the first node in response to the processed first data. The method includes uploading the processed first data from the first node via the Internet. The method includes processing second data from a second plurality of sensors of the second node. The method includes controlling a second digital display of the second node in response to the processed second data. The method includes uploading the processed second data from the second node via the Internet. Each of the first and second nodes is attached to a utility pole, a light pole, a kiosk, or a motor vehicle. Related systems are also provided.

20 Claims, 12 Drawing Sheets

Related U.S. Application Data

(60) Provisional application No. 62/964,916, filed on Jan. 23, 2020, provisional application No. 62/944,387, filed on Dec. 6, 2019.

(51) Int. Cl.
*H04S 7/00* (2006.01)
*G08G 1/005* (2006.01)
*H04L 67/12* (2022.01)
*H04R 5/04* (2006.01)

(58) Field of Classification Search
USPC .................................................... 381/18, 19
See application file for complete search history.

(56) References Cited

U.S. PATENT DOCUMENTS

2017/0330237 A1* 11/2017 Canceri ................. G06F 3/0481
2020/0027351 A1    1/2020 Gotoda et al.
2021/0384738 A1   12/2021 Clay et al.

OTHER PUBLICATIONS

Brandom, Russell "GE's Smart City project now includes streetlights with gunshot detection" The Verge (Oct. 26, 2015).
Gagliordi, Natalie "GE, AT&T ink smart city deal around Current's CityIQ sensors", ZD Net (Feb. 27, 2017).

* cited by examiner

METHODS OF CONTROLLING A DIGITAL DISPLAY BASED ON SENSOR DATA, AND RELATED SYSTEMS

CROSS-REFERENCE TO RELATED APPLICATIONS

The present application is a continuation of and claims the benefit of U.S. patent application Ser. No. 17/112,025, filed Dec. 4, 2020, which claims the benefit of U.S. Provisional Patent Application No. 62/944,387, filed Dec. 6, 2019, and U.S. Provisional Patent Application No. 62/964,916, filed Jan. 23, 2020, the disclosures of which are hereby incorporated herein in their entireties by reference.

FIELD

The present disclosure relates to sensors, digital displays, and wireless communications platforms.

BACKGROUND

Digital cameras have proliferated in both private and public spaces. Accordingly, the collection of digital image data has become increasingly common, and demand for communications network bandwidth to communicate the data has also increased. Converting raw data from cameras into helpful information, however, can be difficult. As an example, communicating and analyzing large amounts of video data can strain bandwidth and processing resources.

SUMMARY

A system, according to embodiments of the present inventive concepts, may include a first outdoor node including a first digital display, a first processor, and a first plurality of sensors. The system may include a second outdoor node including a second digital display, a second processor, and a second plurality of sensors. The first and second outdoor nodes may be at different first and second outdoor locations, respectively, in a geographic area. The first processor may be configured to process first data from the first plurality of sensors. The first processor may be configured to control the first digital display in response to the processed first data. The first processor may be configured to control uploading via the Internet of the processed first data. Moreover, the second processor may be configured to process second data from the second plurality of sensors. The second processor may be configured to control the second digital display in response to the processed second data. The second processor may be configured to control uploading via the Internet of the processed second data.

In some embodiments, the geographic area may be a city, a school campus, a residential community, an industrial park, a military base, or a recreation area. Moreover, the processed first data may include a count of objects detected by the first plurality of sensors, and the processed second data may include a count of objects detected by the second plurality of sensors.

According to some embodiments, the system may include a server or group of servers. Uploading the processed first and second data via the Internet may include transmitting the processed first and second data to the server or group of servers.

In some embodiments, the first plurality of sensors may include multiple types of sensors. For example, the first plurality of sensors may include a camera and a microphone. Moreover, the first plurality of sensors may include an atmospheric pollution sensor or other weather sensor.

According to some embodiments, the first plurality of sensors may include a device-temperature sensor that is configured to detect a temperature of one or more components of the first outdoor node.

A method of operating first and second nodes that are in a system of nodes, according to embodiments of the present inventive concepts, may include processing first data from a first plurality of sensors of the first node. The method may include controlling a first digital display of the first node in response to the processed first data. The method may include uploading the processed first data from the first node via the Internet. The method may include processing second data from a second plurality of sensors of the second node. The method may include controlling a second digital display of the second node in response to the processed second data. Moreover, the method may include uploading the processed second data from the second node via the Internet. The first node may be attached to a first utility pole, a first light pole, a first digital banner, a first kiosk, or a first mass-transit vehicle. The second node may be attached to a second utility pole, a second light pole, a second digital banner, a second kiosk, or a second mass-transit vehicle.

In some embodiments, the first and second nodes may be in different first and second locations, respectively, in a city, on a school campus, in a residential community, in an industrial park, on a military base, or in a recreation area.

According to some embodiments, the processed first data may include a count of objects detected by the first plurality of sensors, and the processed second data may include a count of objects detected by the second plurality of sensors. For example, the count of objects detected by the first plurality of sensors may include a count of pedestrians that are adjacent the first node, and the count of objects detected by the second plurality of sensors may include a count of motor vehicles that are adjacent the second node. Moreover, the count of objects detected by the first plurality of sensors may include a count of human faces that look at the first digital display.

In some embodiments, uploading the processed first and second data via the Internet may include transmitting the processed first and second data to a server or group of servers.

According to some embodiments, the first plurality of sensors may include multiple types of sensors. For example, the first plurality of sensors may include a camera and a microphone. Moreover, the first plurality of sensors may include an atmospheric pollution sensor or other weather sensor.

In some embodiments, the method may include controlling a traffic light and/or a pedestrian crosswalk signal, in response to the processed first data.

According to some embodiments, controlling the first digital display may include identifying, via the first digital display, a plurality of open parking spots that are adjacent the first node.

In some embodiments, controlling the first digital display may include changing an image on the first digital display in response to a weather condition that is indicated by the processed first data. Additionally or alternatively, controlling the first digital display may include changing a screen brightness level of the first digital display in response to a signal received by the first node via a wireless communications network or in response to the processed first data.

According to some embodiments, the first plurality of sensors may include a microphone. Uploading the processed first data may be performed in response to detecting, by the microphone, a noise level that exceeds a threshold noise level. Moreover, uploading the processed first data may be performed in response to detecting, by the microphone, a gunshot or a motor vehicle collision.

In some embodiments, the processed first data may include an indication that passersby on scooters, bicycles, skateboards, and/or hoverboards have been detected by the first node.

According to some embodiments, processing first data may include: counting a person detected by the first plurality of sensors; and refraining from re-counting the person for a predetermined amount of time.

In some embodiments, the method may include receiving the processed first data at the second node via a wireless communications network. Moreover, the method may include controlling the second digital display of the second node in response to the processed first data.

According to some embodiments, the first plurality of sensors may include a device-temperature sensor that detects a temperature of one or more components of the first node. For example, uploading the processed first data may be performed in response to detecting, by the device-temperature sensor, that the temperature of the one or more components of the first node meets or exceeds a threshold temperature, such as 140 degrees Fahrenheit. Moreover, uploading the processed first data may include uploading a daily report of temperature conditions that are detected by the device-temperature sensor.

A method of operating first and second nodes that are in a system of nodes, according to embodiments of the present inventive concepts, may include processing first data from a first plurality of sensors of the first node. The first plurality of sensors may include a device-temperature sensor that detects a temperature of one or more components of the first node. The method may include uploading the processed first data from the first node via the Internet. Uploading the processed first data may include: uploading a daily report of temperature conditions that are detected by the device-temperature sensor; or uploading the processed first data in response to detecting, by the device-temperature sensor, that the temperature of the one or more components of the first node meets or exceeds a threshold temperature. The method may include processing second data from a second plurality of sensors of the second node. Moreover, the method may include uploading the processed second data from the second node via the Internet. The first node may be attached to a first utility pole, a first light pole, a first digital banner, a first kiosk, or a first mass-transit vehicle. The second node may be attached to a second utility pole, a second light pole, a second digital banner, a second kiosk, or a second mass-transit vehicle.

In some embodiments, the first plurality of sensors may include multiple types of sensors. For example, the first plurality of sensors may include a camera and a microphone, in addition to the device-temperature sensor. Moreover, the first plurality of sensors may include an atmospheric pollution sensor or other weather sensor.

According to some embodiments, the method may include controlling one or more active-cooling elements of the first node in response to detecting, by the device-temperature sensor, that the temperature of the one or more components of the first node meets or exceeds the threshold temperature.

DETAILED DESCRIPTION

Figure 1A:
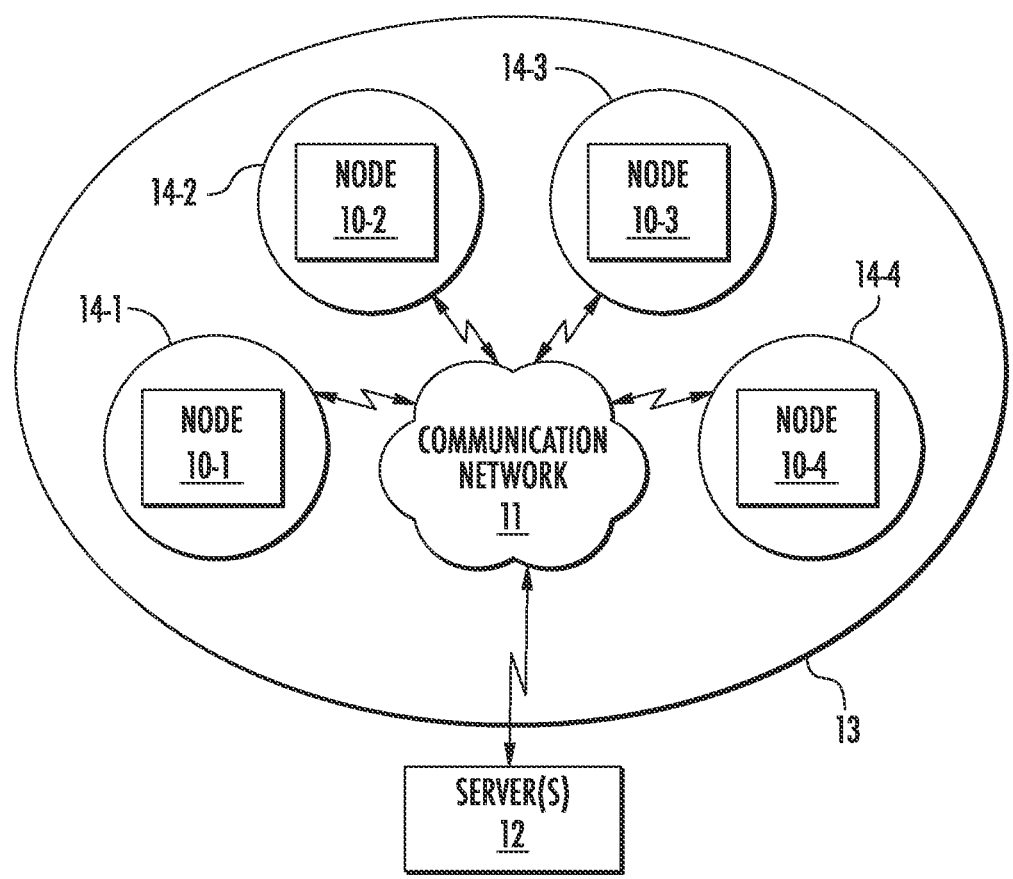
FIG. 1A is a schematic illustration of a geographic area including nodes that each have multiple sensors, according to embodiments of the present inventive concepts.

Pursuant to embodiments of the present inventive concepts, systems and methods are provided that can serve as a communications platform to enable smart cities. For example, the platform can collect raw data about a city environment and apply algorithms to provide meaningful information to residents and visitors alike. Optical sensors can count pedestrian traffic and vehicular traffic, and this data can be used to improve traffic, such as by (a) controlling a traffic light and/or a pedestrian crosswalk signal and/or (b) identifying open parking spots, among other implementations. Additional sensors can compute air quality, noise level, and weather observations (e.g., temperature and humidity), among others. For example, a node that detects stopped motor vehicle traffic and/or high pollution can transmit a signal to force a green light, thus reducing vehicular stop time and emissions.

Leveraging optics as sensors, artificial intelligence ("AI") can be cost-effectively applied for object detection. A camera can act as a sensor, and AI can count the number of objects in a digital image frame, such as the number of people. Moreover, optical sensors may include a camera that operates in the visible-light spectrum and/or a camera that operates beyond the visible-light spectrum. For example, a camera may be an infrared camera.

By using multiple types of sensors at a node in a smart-city system, the node can provide more reliable, more localized, and more detailed data. For example, the node can advantageously combine data from audio and video sensors rather than relying on only video sensors or only audio sensors. As another example, the node can advantageously combine data from weather, device-temperature, and video sensors rather than relying on only video, device-temperature, or weather sensors. Such data derived from multiple types of sensors can be helpful for tracking criminal activity, treating roads for weather conditions, reducing energy consumption of a display of the node, reducing pollution, and finding a parking spot, among other uses.

Moreover, by processing sensor data at the node and wirelessly transmitting the processed (i.e., smaller and targeted) data rather than raw data, wireless communications bandwidth used by the node can be reduced. For example, the node can count the number of people who have passed by the node and can wirelessly transmit the count to the cloud rather than uploading a video of the people to the cloud. Accordingly, flexible processing of sensor data can be remotely throttled (e.g., dynamically adjusted) to occur primarily at the node and/or in the cloud, as warranted. For example, during mild temperatures, weather data may be processed at a node whose sensor detects the weather, but the node may be instructed to report back to the cloud as temperatures near the freezing/icing point, which may facilitate informing a broader range of a city's occupants.

Example embodiments of the present inventive concepts will be described in greater detail with reference to the attached figures.

Figure 2A:
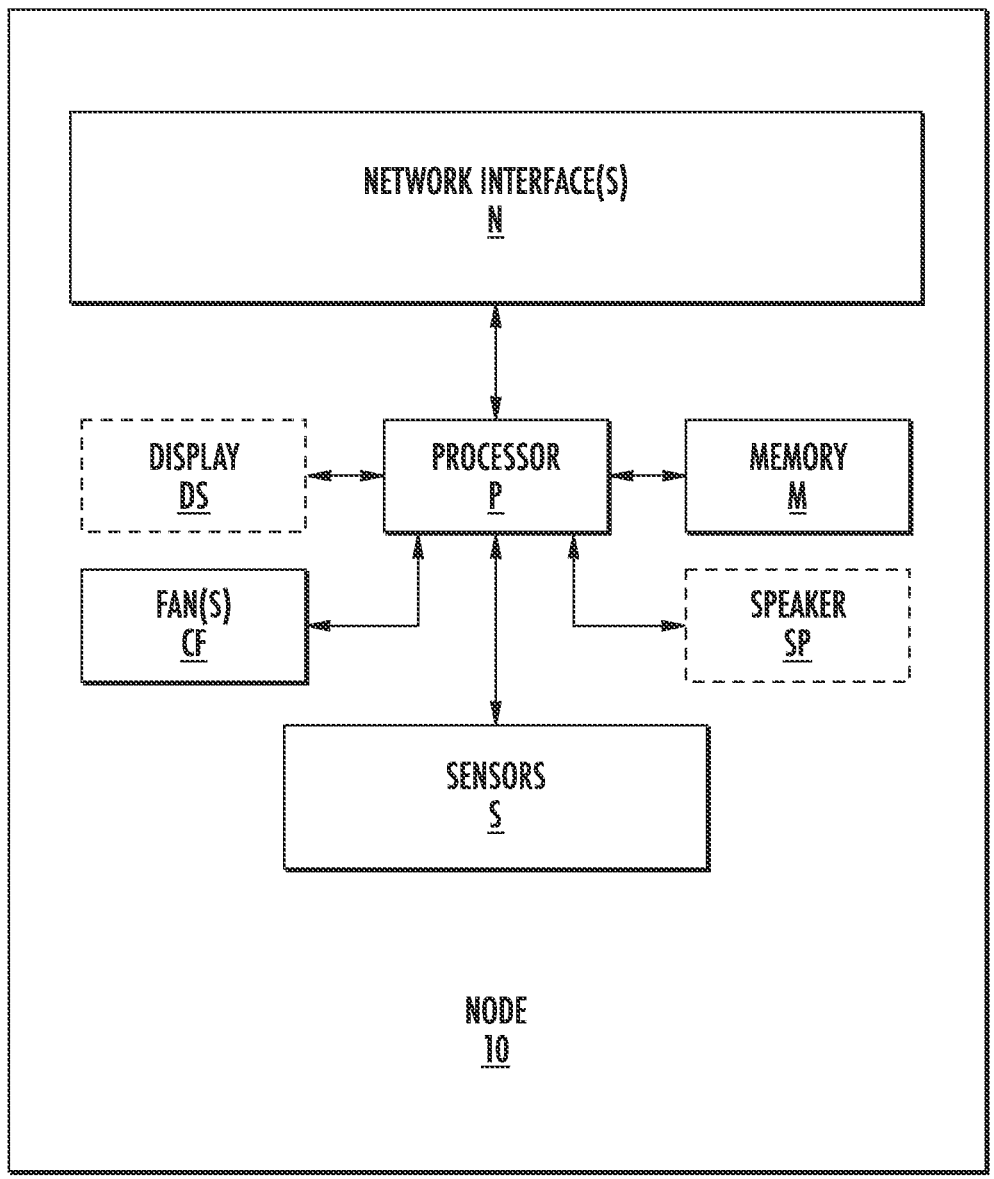
FIG. 2A is a block diagram of a node that has multiple sensors, according to embodiments of the present inventive concepts.

FIG. 1A is a schematic illustration of a geographic area 13 including nodes 10 that each have multiple sensors S (FIG. 2A). The geographic area 13 may be, for example, a city or portion thereof (e.g., a downtown area), a school campus, a residential community, an industrial park, a military base, or a recreation area. The nodes 10, which are at different respective physical locations 14, may communicate with one or more servers 12 via a communication network 11. For example, the communication network 11 may comprise a wireless network, such as a cellular (e.g., 3G/4G/5G/LTE, other cellular) network. In some embodiments, the nodes 10 may be referred to herein as "transponders" because they frequently (e.g., multiple times per hour) transmit data based on activity/conditions detected by the sensors S.

For simplicity of illustration, four nodes 10-1 through 10-4 are shown at respective locations 14-1 through 14-4 in the geographic area 13. Some geographic areas 13, however, may include dozens, hundreds, or more nodes 10 at respective locations 14. The locations 14 may include outdoor locations, such as light poles, and/or may include kiosks that may be indoors or outdoors. Accordingly, one or more of the nodes 10-1 through 10-4 may be an outdoor node that is located outdoors.

By sharing data with each other (e.g., via the communication network 11), a group of nodes 10 in the geographic area 13 can provide a synergistic benefit of sensors S teaming up despite being at different locations 14. For example, a city occupant that needs to drive to work may be very interested to know that sensors S on the west side of town are all detecting a freezing state. A prediction of when ice may become problematic for the city occupant's commute may be provided (e.g., displayed) via a local node 10 as the weather pattern is approaching the occupant's direction. Accordingly, the teaming up of sensors S may provide an additional level of information (beyond raw data) to city occupants, whether in the weather context or other contexts.

Figure 1B:
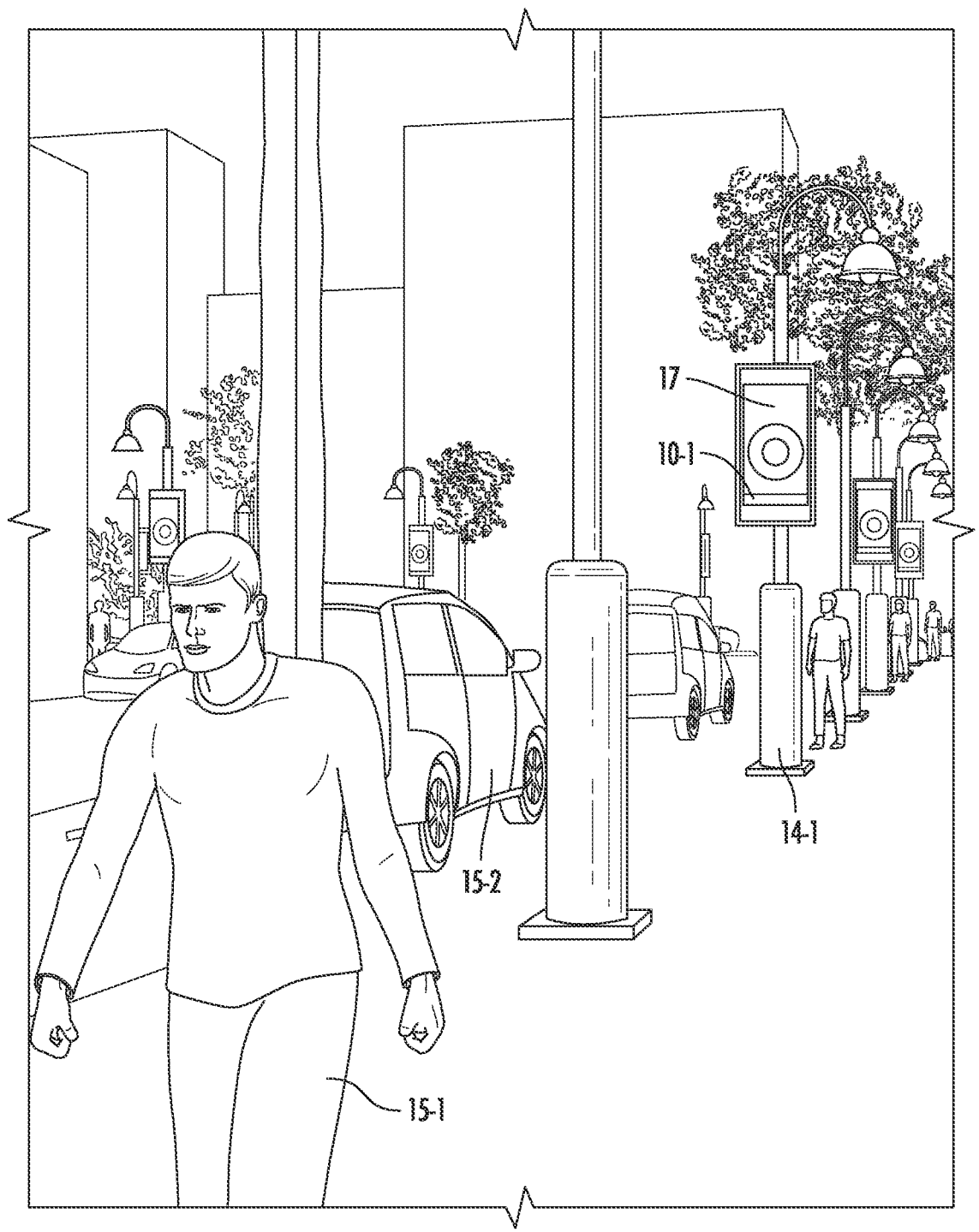
FIG. 1B is a schematic illustration of a node on a light pole, according to embodiments of the present inventive concepts.

FIG. 1B is a schematic illustration of a node 10-1 at a location 14-1 that is a light pole. One or more sensors S (FIG. 2A) of the node 10-1 may be configured to detect various objects. Examples of the objects include pedestrians, such as object 15-1, and/or motor vehicles, such as object 15-2. For example, the node 10-1 may include one or more optical sensors C (FIG. 2B) and/or one or more microphones MIC (FIG. 2B) that are configured to detect the objects 15-1 and 15-2. Moreover, a processor P (FIG. 2A) of the node 10-1 can use computer readable program code PC (FIG. 2C) to distinguish between the objects 15-1 and 15-2. In some embodiments, the sensor(s) S of the node 10-1 may be configured to detect passersby on scooters, bicycles, and skateboards/hoverboards.

In some embodiments, the node 10-1 may include a digital display DS (FIG. 2A), which can display digital messaging (a digital advertisement, public service announcement, etc.) 17 or other digital images. For example, the digital messaging 17 can be displayed in response to processed sensor S data. As an example, the digital messaging 17 can be displayed in response to detecting a person (e.g., an object resembling a human) and/or in response to detecting a particular weather condition.

The node 10-1 may have various use cases. For example, data regarding pedestrian and vehicular traffic may be collected and processed to perform various value-added functions, including changing digital signage messaging and/or changing the timing of traffic signals. In some embodiments, one or more optical sensors C of the node 10-1 may comprise a video sensor that is used to count people for the purpose of targeting marketing impressions. For example, video sensor(s) may count the number of people who walk past the node 10-1 and/or the number of people whose faces look at a digital display DS of the node 10-1. Similarly, video sensor(s) can be used to count motor vehicles for the purpose of working with municipalities to improve traffic flow (e.g., to reduce congestion and emissions, improving parking, and so forth). Additionally or alternatively, an optical sensor C can capture an image of a motor vehicle license plate, and the node 10-1 can process the image to determine the license plate number, which the node 10-1 can then wirelessly transmit to law enforcement.

In some embodiments, a node 10 may comprise a digital banner, such as any of the pole-mountable digital banners in U.S. application Ser. No. 29/593,127, filed Feb. 6, 2017 (now U.S. Pat. No. D847,107), the entire content of which is hereby incorporated by reference herein. Each digital banner may comprise at least one digital display DS, and sensors S of the node 10 may be on/in a housing of the digital banner. For example, some digital banners may be double-sided and thus may comprise two digital displays (i.e., two digital display screens) DS that face in opposite directions. Similarly, optical sensors C may be on opposite sides of a pole and/or on opposite sides of a digital banner (e.g., a housing thereof).

Weather conditions may, in some embodiments, be captured to help drive content on the screen(s) of a digital banner. For example, when weather sensor(s) W (FIG. 2B) at a location 14 detect that the local ambient temperature exceeds 80° F., screen(s) at the location 14 can show a public service announcement about the importance of wearing a sun hat and using sunscreen and/or can display an advertisement for sunscreen.

Moreover, optical sensors C may detect open parking spots and display them/their locations on a digital banner. Additionally or alternatively, law enforcement may use data from optical sensor(s) C and/or microphone(s) MIC to detect and record criminal activity. In some embodiments, a node 10 may provide an emergency alert via its digital display DS and/or to the cloud, in response to processing data that indicates an emergency event. For example, the node 10 can provide an emergency alert with respect to a detected active shooter and/or terrorist attack, thus providing valuable information to people in a city. As another example, the node 10 may display/upload local crime trends, such as by informing city occupants that a series of car break-ins have occurred recently on a particular street at night.

Figure 1C:
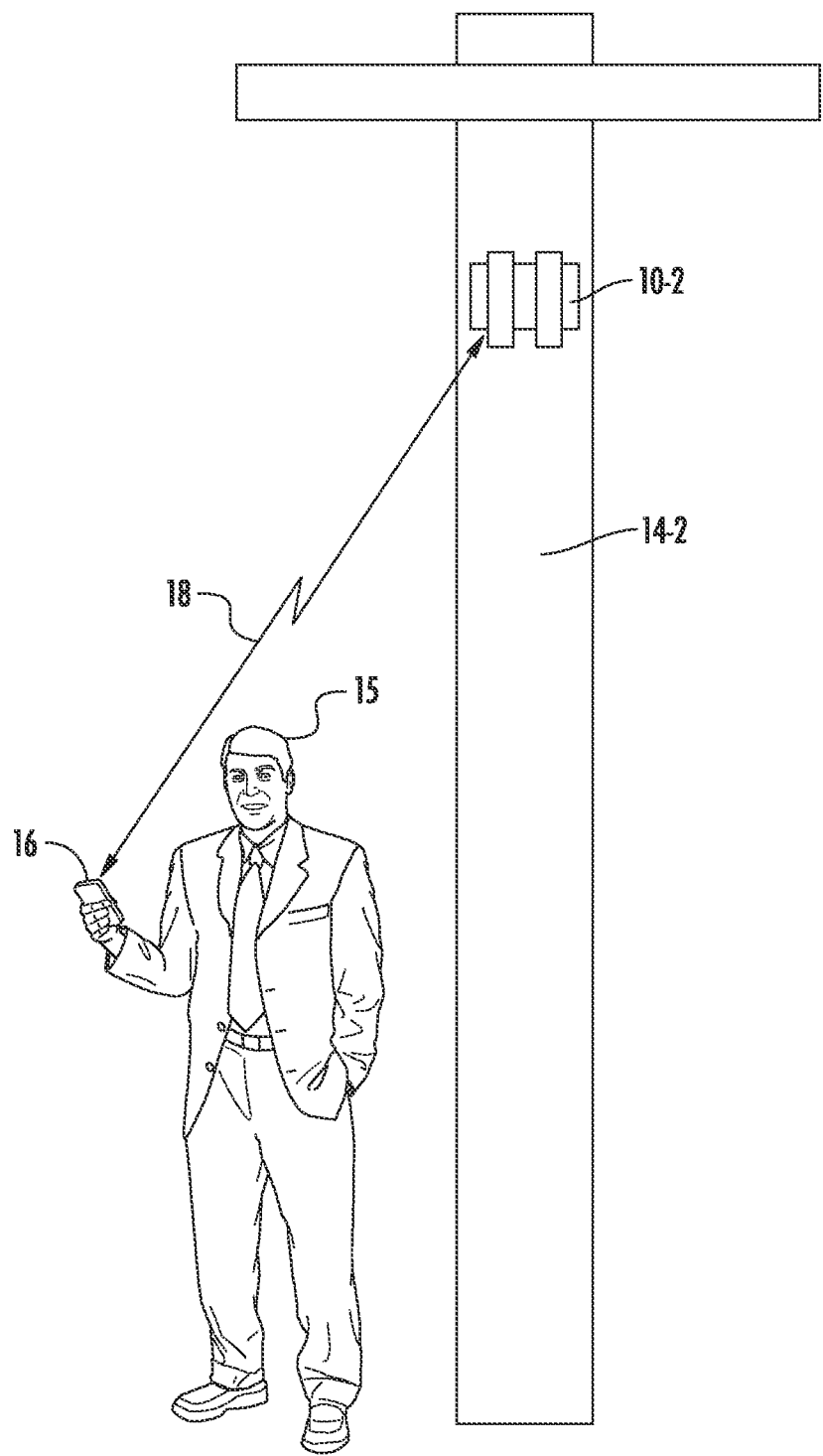
FIG. 1C is a schematic illustration of a node on a utility pole, according to embodiments of the present inventive concepts.

FIG. 1C is a schematic illustration of a node 10-2 on a location 14-2 that is a utility pole. In some embodiments, the node 10-2 may not have a digital display DS (FIG. 2A). The node 10-2 may still collect and process data, however, from sensors S (FIG. 2A) and may upload processed data to the cloud (i.e., the Internet) via a communication network 11 (FIG. 1A). Moreover, in some embodiments, the node 10-2 may transmit processed data to an electronic device 16 via a short-range communications (e.g., Wi-Fi) link 18. For example, the electronic device 16 may be a smartphone of a person who may be detected by the node 10-2 as an object 15. Also, a wired power source at the utility pole may, in some embodiments, be used to power the sensors S.

Figure 1D:
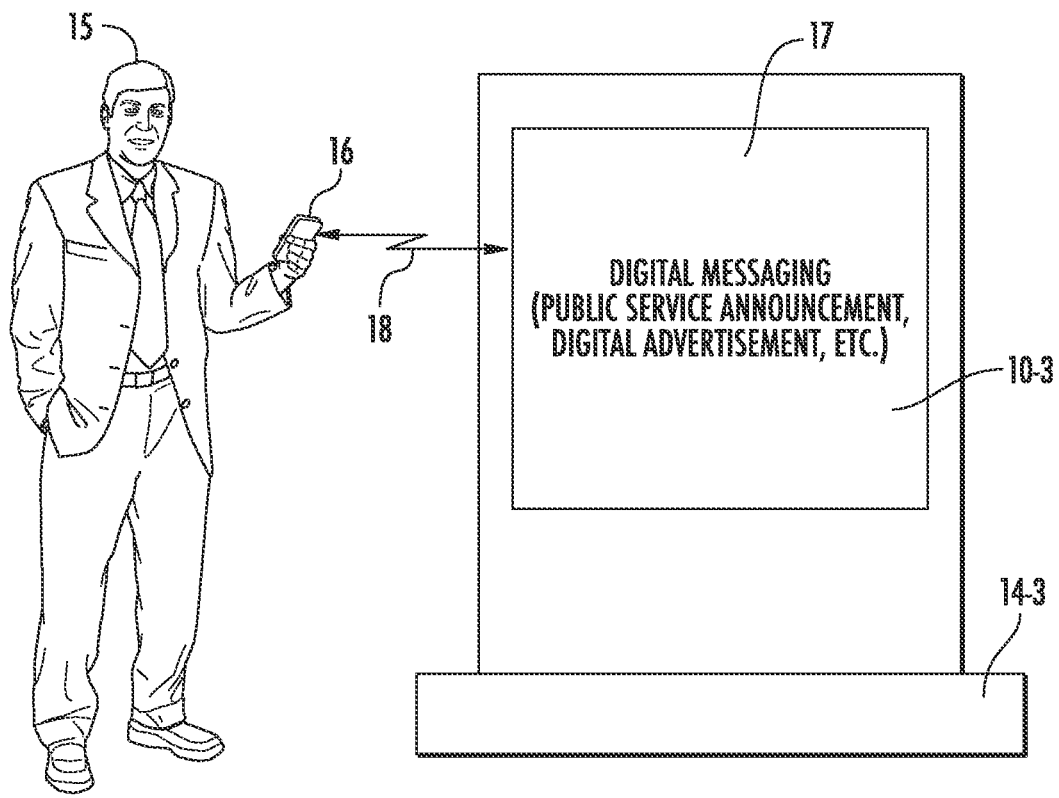
FIG. 1D is a schematic illustration of a kiosk comprising a node, according to embodiments of the present inventive concepts.

FIG. 1D is a schematic illustration of a location 14-3 that is a digital kiosk comprising a node 10-3. In some embodiments, sensors S (FIG. 2A) of the node 10-3 may be mounted in/on an upper half of the kiosk. Such an elevated position may provide the sensors S with a better vantage point for detecting objects 15. The sensors S may include optical sensors C (FIG. 2B), such as one or more high-definition (e.g., 720p, 1080p, 4K, 8K, or higher resolution) video cameras. Moreover, a processor P (FIG. 2A) of the node 10-3 may use computer readable program code PC (FIG. 2C) to perform video analytics at the kiosk based on data from the high-definition cameras. For example, the video analytics may include counting pedestrians (i.e., objects 15 that the video analytics identify as people). In some embodiments, the kiosk may be a portable kiosk that counts pedestrians to determine whether the kiosk should be moved to a different location with more foot traffic.

The node may also include a digital display DS (FIG. 2A), which can display digital messaging 17 or other digital images. Accordingly, by including both the display DS and the sensors S, the node 10-3 can change the digital information that it displays based on data collected by the sensors S. Different nodes 10 in a geographic area 13 (FIG. 1A) can thus display different information, which can be tailored to conditions detected at different locations 14. In some embodiments, the geographic area 13 may include hundreds (e.g., 200) of light poles that have sensors S and displays DS and at least one hundred kiosks that have sensors S and displays DS. Accordingly, data can be captured from cameras and other sensors S situated throughout a city (or portion thereof) via digital banners and kiosks.

In addition to, or as an alternative to, changing the digital information that is displayed by the display DS, the node 10-3 can change a screen brightness level of the display DS based on data collected by the sensors S. For example, the node 10-3 can dim the brightness of the display DS during extremely hot ambient temperature conditions to protect the display DS and other electronics inside the node 10-3. The hot ambient temperature conditions may be detected by one or more of the sensors S, such as by a weather sensor W (FIG. 2B) and/or by a device-temperature sensor DT (FIG. 2B) that detects temperature conditions of one or more components (e.g., the display DS and/or other electronics) of the node 10-3. As another example, the node 10-3 can dim the brightness of the display DS to shed load in response to a signal received via a communication network 11 (FIG. 1A) from a local electric utility during peak electricity demand periods.

Figure 1E:
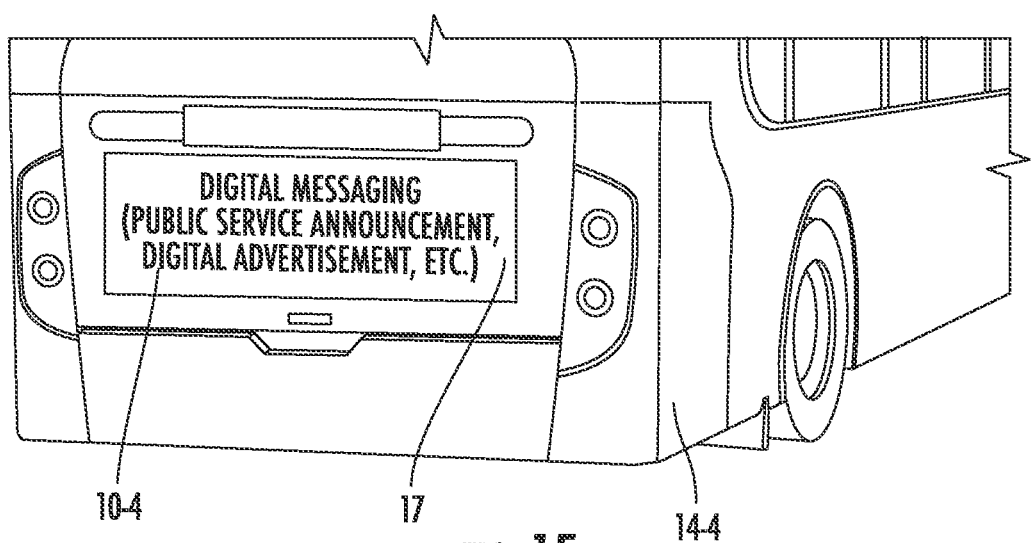
FIG. 1E is a schematic illustration of a node on a mass-transit vehicle, according to embodiments of the present inventive concepts.

FIG. 1E is a schematic illustration of a node 10-4 at a location 14-4 that is a mass-transit vehicle (e.g., a bus or train). By including both a display DS (FIG. 2A) and sensors S (FIG. 2A), the node 10-4 can change the digital information that it displays based on data collected by the sensors S. Moreover, the node 10-4 may, in some embodiments, be on a police car or other motor vehicle (e.g., another law enforcement vehicle) that is not a mass-transit vehicle.

FIG. 2A is a block diagram of a node 10 that has multiple sensors S. In some embodiments, the sensors S include different types of sensors (e.g., at least one optical sensor C (FIG. 2B) and at least one microphone MIC (FIG. 2B)). Moreover, in some embodiments, the sensors S include multiple ones of at least one type of sensor (e.g., multiple optical sensors C).

In addition to the sensors S, the node 10 includes a processor P and a memory M that the node 10 can use to process data from the sensors S. In some embodiments, a sensor S may include a dedicated processor P that processes data from only that particular sensor S. The node 10 also includes one or more network interfaces N, such as a Wi-Fi interface and/or a cellular interface. Moreover, the node 10 may include a speaker SP and/or a digital display DS, which may be a high-definition display screen.

The network interfaces N can communicate over Internet Protocol, and may comprise any radio frequency ("RF") transceiver, including cellular, BLUETOOTH®, Wi-Fi, and/or LoRa (Long Range) transceivers, among others. For example, the node 10 may use Wi-Fi local-area network ("LAN") data communications backhaul and/or fiber wide-area network ("WAN") data communications backhaul.

According to some embodiments, one or more active thermal-management elements, such as one or more fans CF or one or more heating elements, may be inside the node 10 and may be controlled to cool or heat the node 10 in response to detecting a high or low internal temperature. For example, the active-cooling element(s) may be controlled to initiate (or increase the rate of) cooling inside the node 10. Examples of increasing the rate of cooling include increasing fan CF speed and/or increasing the number of fans CF that are concurrently rotating inside the node 10.

Figure 2B:
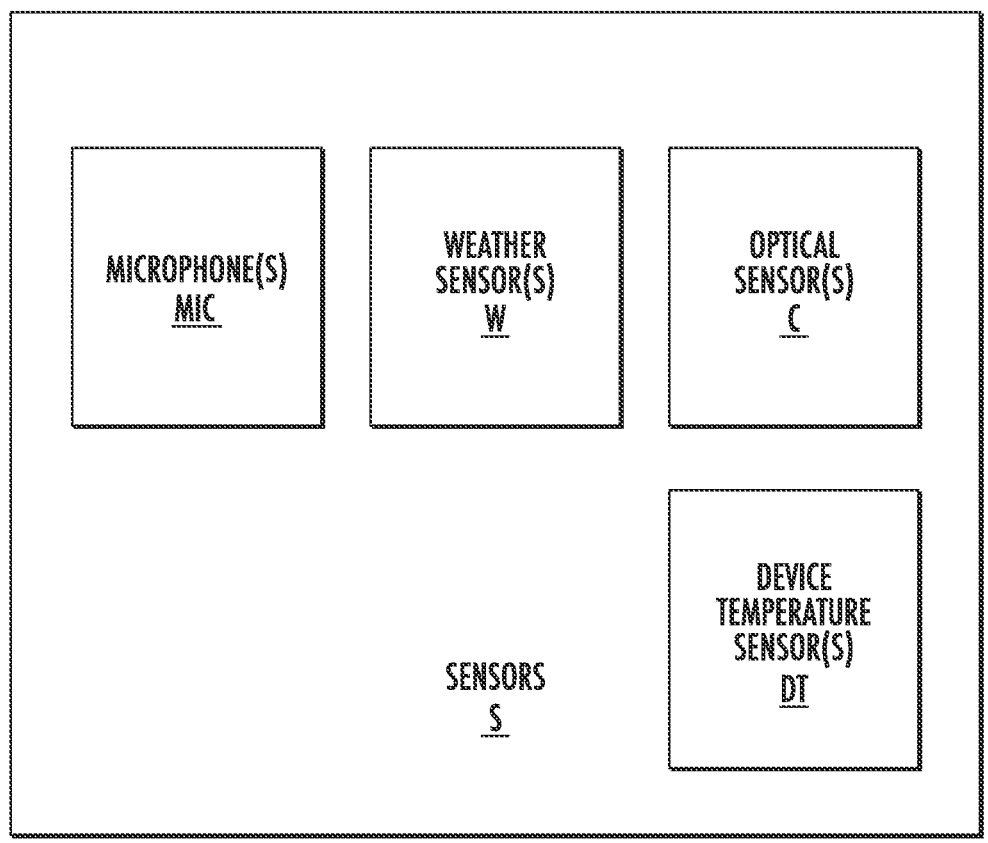
FIG. 2B is a block diagram of sensors of a node, according to embodiments of the present inventive concepts.

FIG. 2B is a block diagram of sensors S of a node 10 (FIG. 2A). The sensors S may include (i) at least one microphone MIC, (ii) at least one weather sensor W, (iii) at least one optical sensor C, and/or (iv) at least one device-temperature sensor DT. For example, the node 10 may use a microphone MIC to detect noise-level data. Upon detecting that a noise-level threshold (e.g., a predefined noise-ordinance threshold) has been exceeded, the node 10 can display a warning via a display DS (FIG. 2A) and/or can transmit a message to authorities via a network interface N (FIG. 2A). Moreover, the node 10 may use a microphone MIC to detect audible anomalies, such as gunshots or motor vehicle collisions, and then may transmit a message to authorities via a network interface N. In some embodiments, the node 10 may monitor noise levels and alert a network operations center or a customer contact in response to noise-level data. This data may optionally also be fed into one or more housing websites (e.g., as a score, such as a "walking score") for the benefit of potential buyers/renters.

A device-temperature sensor DT may detect temperature conditions (e.g., to identify and/or limit possible overheating) of one or more components of the node 10. As an example, the device-temperature sensor DT may, in some embodiments, be a sensor inside the display DS.

The network interface(s) N may include, for example, short-range wireless communications circuitry, such as Wi- Fi circuitry and/or BLUETOOTH® circuitry. Additionally or alternatively, the network interface(s) N may include cellular communication circuitry that provides a cellular wireless interface (e.g., 4G/5G/LTE, other cellular) and/or circuitry that provides a wireless mesh network interface.

In some embodiments, the node 10 may use a weather sensor W to collect temperature, humidity, carbon dioxide, wind speed, or other weather data. For example, the weather sensor W may include a thermometer, a humidity sensor, an anemometer, a barometric pressure sensor, and/or an air pollution sensor. As an example, the weather sensor W may be an atmospheric pollution sensor, which may be configured to detect ozone, radon, radiation, sulfur dioxide, and/or other indicators of atmospheric pollution. Moreover, the atmospheric pollution sensor may, in some embodiments, be included in addition to another type of weather sensor W, such as a thermometer.

The node 10 may, in some embodiments, include a limited number (e.g., 3, 4, 5, 6, 7, 8, 9, or fewer) sensors S. For example, by using a limited number of camera and environmental sensors, the node 10 can significantly reduce system cost and complexity while improving reliability. In some embodiments, the node 10 may have three or fewer cameras. As used herein, the term "environmental sensors" may refer to weather sensors W (including air-quality sensors) and/or noise-detection sensors (including microphones MIC).

Figure 2C:
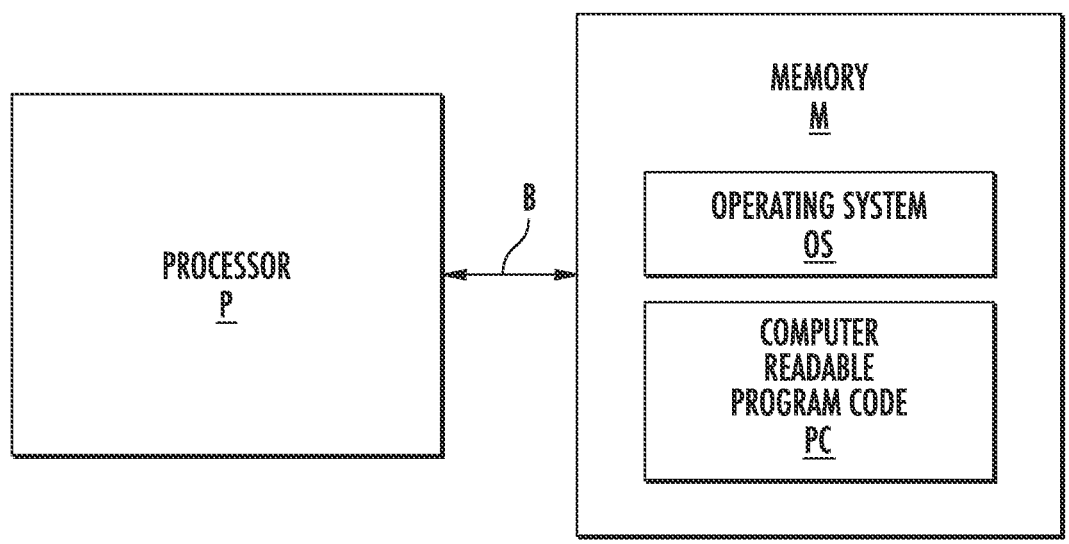
FIG. 2C is a block diagram that illustrates details of an example processor and memory that may be used in accordance with various embodiments.

FIG. 2C is a block diagram that illustrates details of an example processor P and memory M that may be used in accordance with various embodiments. The processor P communicates with the memory M via an address/data bus B. The processor P may be, for example, a commercially available or custom microprocessor. Moreover, the processor P may include multiple processors. The memory M may be a non-transitory computer readable storage medium and may be representative of the overall hierarchy of memory devices containing the software and data used to implement various functions of a node 10 (FIG. 2A), an electronic device 16 (FIG. 1C), or a server 12 (FIG. 1A) as described herein. The memory M may include, but is not limited to, the following types of devices: cache, ROM, PROM, EPROM, EEPROM, flash, Static RAM (SRAM), and/or Dynamic RAM (DRAM).

As shown in FIG. 2C, the memory M may hold various categories of software and data, such as computer readable program code PC and/or an operating system OS. The operating system OS controls operations of a node 10, an electronic device 16, or a server 12. In particular, the operating system OS may manage the resources of a node 10, an electronic device 16, or a server 12 and may coordinate execution of various programs by the processor P. For example, the computer readable program code PC, when executed by a processor P of a node 10, may cause the processor P to perform any of the operations illustrated in the flowchart of FIG. 3.

Figure 3:
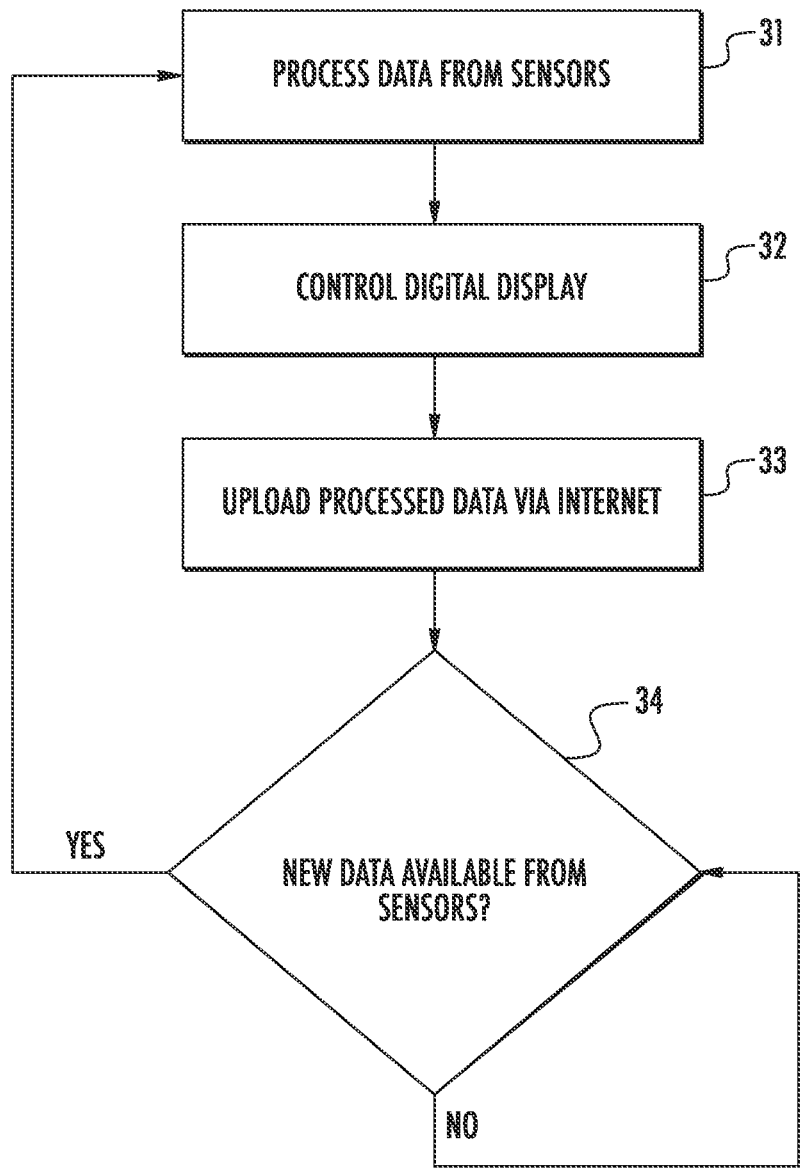
FIG. 3 is a flowchart of operations of a node that has multiple sensors, according to embodiments of the present inventive concepts.

FIG. 3 is a flowchart of operations of a node 10 (FIG. 2A) that has multiple sensors S (FIG. 2A). The operations include processing (Block 31) data from one or more of the sensors S. The operations include controlling (Block 32) a digital display DS (FIG. 2A) of the node 10 in response to the processed data. For example, the node 10 may change a digital image on the display DS based on video data that is collected by one or more optical sensors C (FIG. 2B) of the node 10. Moreover, the operations include uploading (Block 33) the processed data from the node 10 via the Internet (e.g., to one or more servers 12 (FIG. 1A)). As an example, the node 10 may upload metadata (e.g., a count of objects 15 (FIG. 1B)) that summarizes the video data. The uploading operation(s) may be performed before, after, or concurrently with the operation(s) of controlling the display DS.

The frequency at which data is processed (Block 31) by the node 10 may be different from the frequency at which data is uploaded (Block 33) by the node 10. For example, data from the sensors S may be processed (Block 31) by the node 10 at a very fast rate (e.g., at least thirty times per minute or second), whereas processed data may be uploaded (Block 33) by the node 10 at a significantly reduced rate. As an example, the node 10 may capture digital images every second but only upload processed data with respect to the images when something of interest (e.g., people, cars, open parking spots, etc.) is identified in an image.

In some embodiments, the node 10 may continuously process data from the sensors S. Accordingly, as long as the sensors S are generating new data (Block 34), the node 10 may process the new data. Alternatively, the node 10 may periodically (e.g., once per minute) process new data from the sensors S.

Moreover, in the context of pedestrian and/or face detection, operations of processing (Block 31) data may include refraining from counting a pedestrian and/or a human face within a predetermined amount of time (e.g., thirty seconds, one minute, five minutes, etc.) of previously counting the person and/or face. For example, the node 10 may use a detection model that has a short-term memory so that if a person walks behind a pole or a sign or behind a group of people, that person is not double-counted.

Though FIG. 3 illustrates operations of an individual node 10, each node 10 in a system of nodes 10 for a geographic area 13 (FIG. 1A) may perform the operations using its sensors S, display(s) DS, and network interface(s) N (FIG. 2A). For example, a first node 10-1 (FIG. 1A) can perform the operations concurrently or in sequence with a second node 10-2 (FIG. 1A). If a node 10 does not have a display DS, then operation(s) of controlling a display DS may be omitted for that node 10. Moreover, such operation(s) of controlling a display DS may, in some embodiments, be omitted when the node 10 is used to upload data about its internal temperature.

In some embodiments, sensors S of a node 10 may include one or more device-health and status sensors that are configured to monitor the health of the node 10. Accordingly, data that the node 10 processes may be internal/diagnostic data, which can trigger a data upload (e.g., an alert) by the node 10 via the Internet (e.g., to one or more servers 12 (FIG. 1A)) at one or more critical-factor thresholds. For example, the device-health sensors may include device-temperature sensors DT (FIG. 2B) that are configured to detect a temperature of one or more components of the node 10.

A critical-factor threshold may be set at 140 degrees Fahrenheit for uploading alerts via the Internet. The reason for setting the threshold at 140 degrees Fahrenheit is that damage to internal components of the node 10 can begin shortly above this temperature. In response to receiving such an alert, a technician can be dispatched to service the node 10. Additionally or alternatively, one or more active-cooling techniques (e.g., turning on a cooling fan CF (FIG. 2A) that is inside the node 10) can be triggered by the node 10 in response to meeting or exceeding the threshold temperature. Moreover, the node 10 can reduce or turn off power to one or more components (e.g., a digital display DS (FIG. 2A)) in response to meeting or exceeding the threshold temperature.

The node 10 may, in some embodiments, upload a regular (e.g., daily at 16:00) device status report with its internal temperature conditions via the Internet. For example, the report may be an automatically-generated email that indicates (i) a current internal temperature of the node 10, (ii) whether the average internal temperature of the node 10 for a particular day is higher or lower than the average for the previous day, (iii) whether a combination of internal temperature conditions suggests an internal thermal problem for the node 10, (iv) a graph of internal temperatures of the node 10 throughout a day, and/or (v) a table that summarizes internal temperature statistics for the node 10 over the past seven days. Data in the report can advantageously be used to correlate internal temperatures of the node 10 to solar irradiance, rain, cloud cover, etc. at a very granular level.

Figure 4:
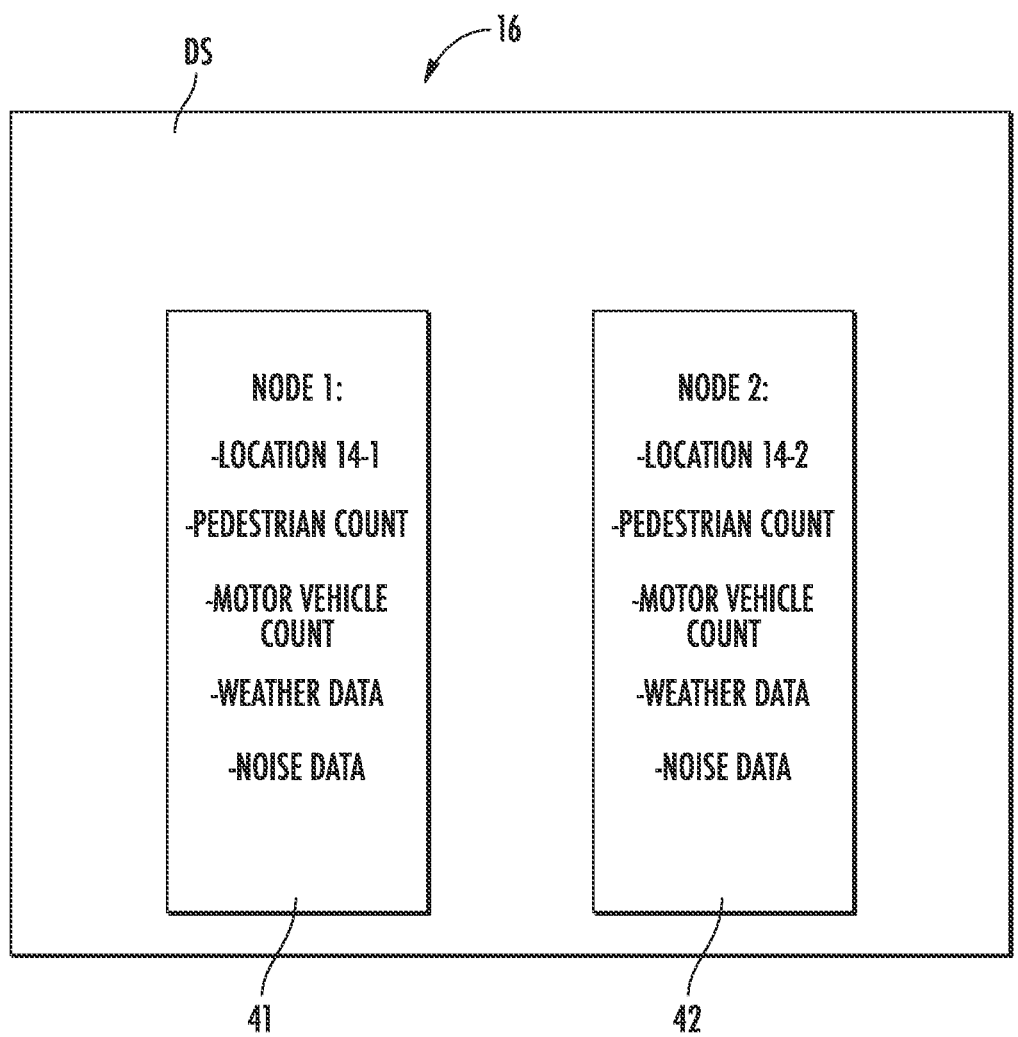
FIG. 4 is a screenshot of a graphical user interface ("GUI") of an electronic device that is configured to communicate with a node, according to embodiments of the present inventive concepts.

FIG. 4 is a screenshot of a GUI of an electronic device 16 (FIG. 1C) that is configured to communicate with a node 10 (FIG. 2A). In some embodiments, the electronic device 16 may be a smartphone, a tablet computer, a laptop computer, or a desktop computer. The electronic device 16 may be configured to communicate with the node 10 (or with one or more servers 12 (FIG. 1A) that communicate with the node 10) via a short-range wireless communications link 18 (FIG. 1C) and/or via the Internet.

For example, the electronic device 16 may access data from one or more servers 12 regarding multiple nodes 10 via the Internet. In particular, the electronic device 16 may access processed sensor S (FIG. 2A) data of multiple nodes 10 via one web portal (e.g., website). As an example, FIG. 4 shows that a digital display DS (FIG. 2A) of the electronic device 16 may display data 411 and 412 regarding nodes 10 that are at different respective locations 14-1 and 14-2 (FIG. 1A). The data 411 and 412 may include a pedestrian count, a motor vehicle count, weather data, and/or noise data detected by the nodes 10. Moreover, the data 411 and 412 may include an identification (e.g., an indication of detection) and/or a count of passersby on scooters, bicycles, and/or skateboards/hoverboards. The data 411 and 412 may be real-time data or data collected over a particular timeframe (e.g., the past hour or past ten minutes).

In some embodiments, rather than displaying raw counts, the digital display DS may display information that is based on an interpretation of the counts. For example, regarding a motor vehicle count, a node 10 may: (i) calculate a traffic delay and display/upload a message that suggests leaving five minutes early to arrive at work on time, (ii) calculate and display/upload a number of open parking spots, (iii) predict (based on the past five Tuesdays or other reference data), and display/upload the prediction, that today (e.g., a Tuesday) three parking spots should be available by 7 AM (e.g., as a result of people vacating parking spots to go to work), and/or (iv) trigger messaging (e.g., advertising) by processed data, such as by triggering a $10-off coupon for a restaurant to let traffic clear in response to estimating a thirty-minute delay in traveling home. The items (i)-(iv) may be displayed on a digital display DS of the node 10 and/or displayed on the digital display DS of the electronic device 16.

In some embodiments, a user can navigate the GUI to select a geographic area 13 (FIG. 1A) having nodes 10 that the user wants to track. For example, the GUI can pull up data by city to track kiosks. The kiosks process data locally and send metadata to the cloud, thus reducing data transmission costs. The data that the GUI displays thus is (or is derived from) the metadata that has been uploaded to the cloud.

Figure 5:
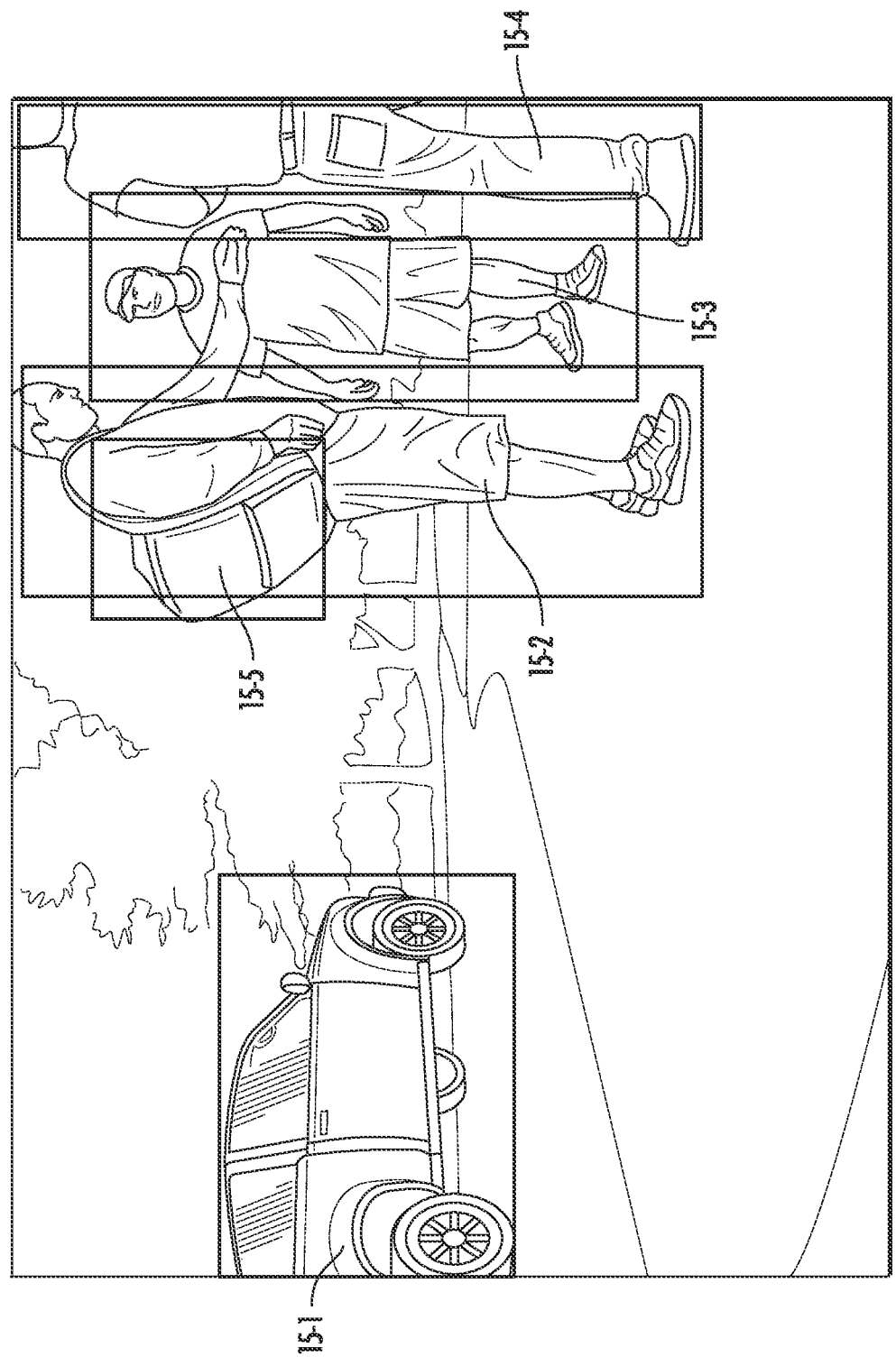
FIG. 5 illustrates a digital image having objects identified therein, according to embodiments of the present inventive concepts.

FIG. 5 illustrates a digital image having objects 15 identified therein. In particular, one or more optical sensors C (FIG. 2B) of a node 10 (FIG. 2A) can capture the image, and a processor P (FIG. 2A) of the node 10 can use one or more object-recognition techniques to distinguish between a motor vehicle (object 15-1), people (objects 15-2 through 15-4), and a non-human, non-motor-vehicle object, such as a backpack (object 15-5) or a pet. In some embodiments, the node 10 may use a machine-learning platform, such as TENSORFLOW®, for object model detection. For example, increased object-detection accuracy can be provided by combining (a) a background elimination technique that rapidly captures multiple consecutive images and detects changes between those images and (b) using TENSORFLOW® for image classification.

Figure 6:
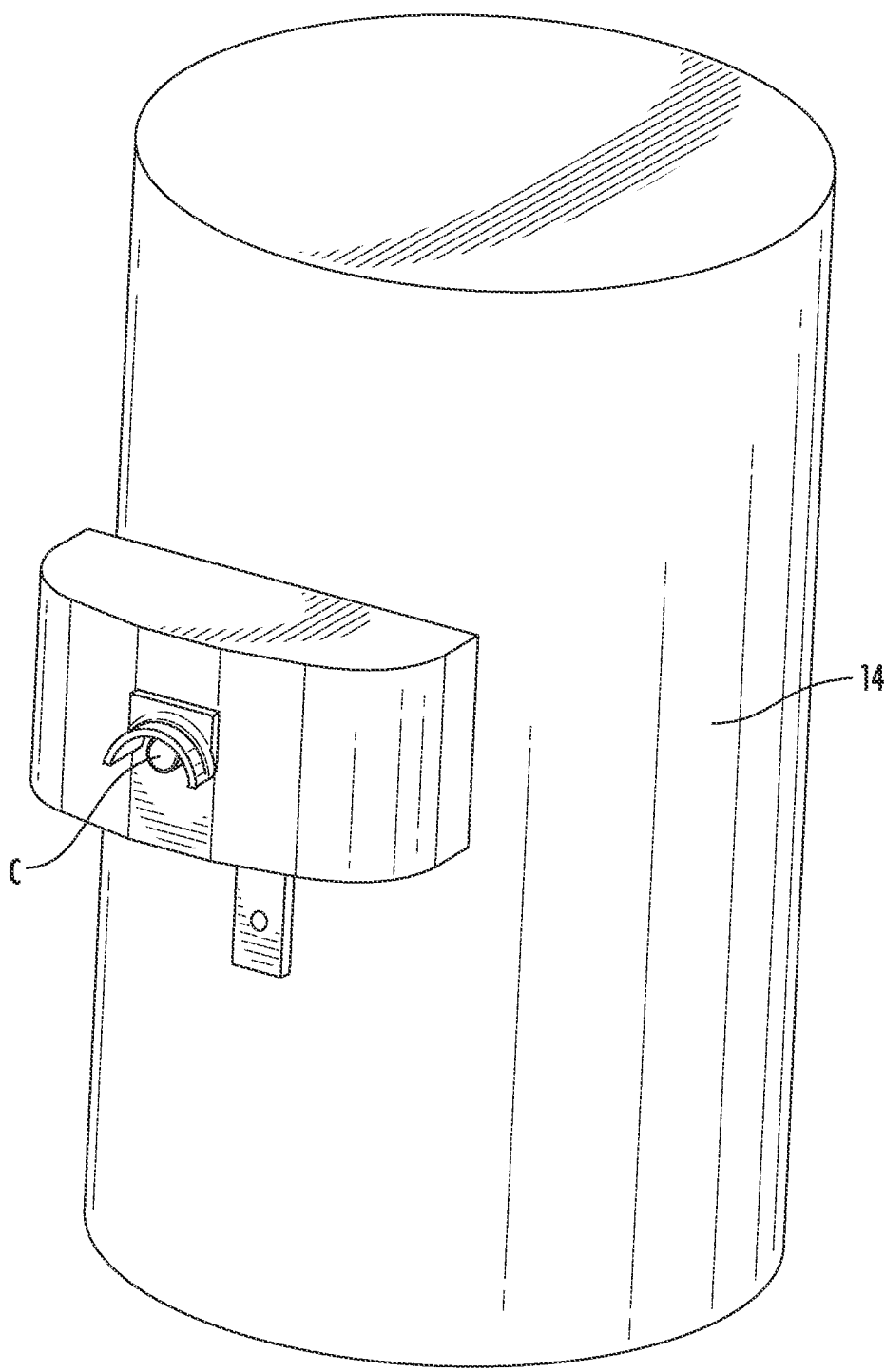
FIG. 6 illustrates a pole-mounted optical sensor, according to embodiments of the present inventive concepts.

FIG. 6 illustrates a pole-mounted optical sensor C. Though one optical sensor C is shown attached to a location 14 that is a pole, more than one optical sensor C may be attached to the pole. A pole-mountable optical sensor C is designed to easily mount to a pole, such as a light pole. The optical sensor C may be positioned relative to a desired target area. For example, a video camera may be mounted at an 85° angle, at a 100-foot target range, and 9 feet off of the ground. Accordingly, motor vehicles, pedestrians, and/or parking spots that are identified by the optical sensor C may be within a line-of-sight and/or 100 feet of the optical sensor C, and thus may be referred to as being "adjacent" a node 10 (FIG. 2A) that includes the optical sensor C. The optical sensor C may be battery powered, solar powered, and/or powered by utility distribution. In some embodiments, all sensors S (FIG. 2B) of the node 10 may be in a single housing and/or may have the same power source. Moreover, if the sensors S are mounted on a light pole, they may be powered by a power source that powers a streetlight on the pole.

Figure 7:
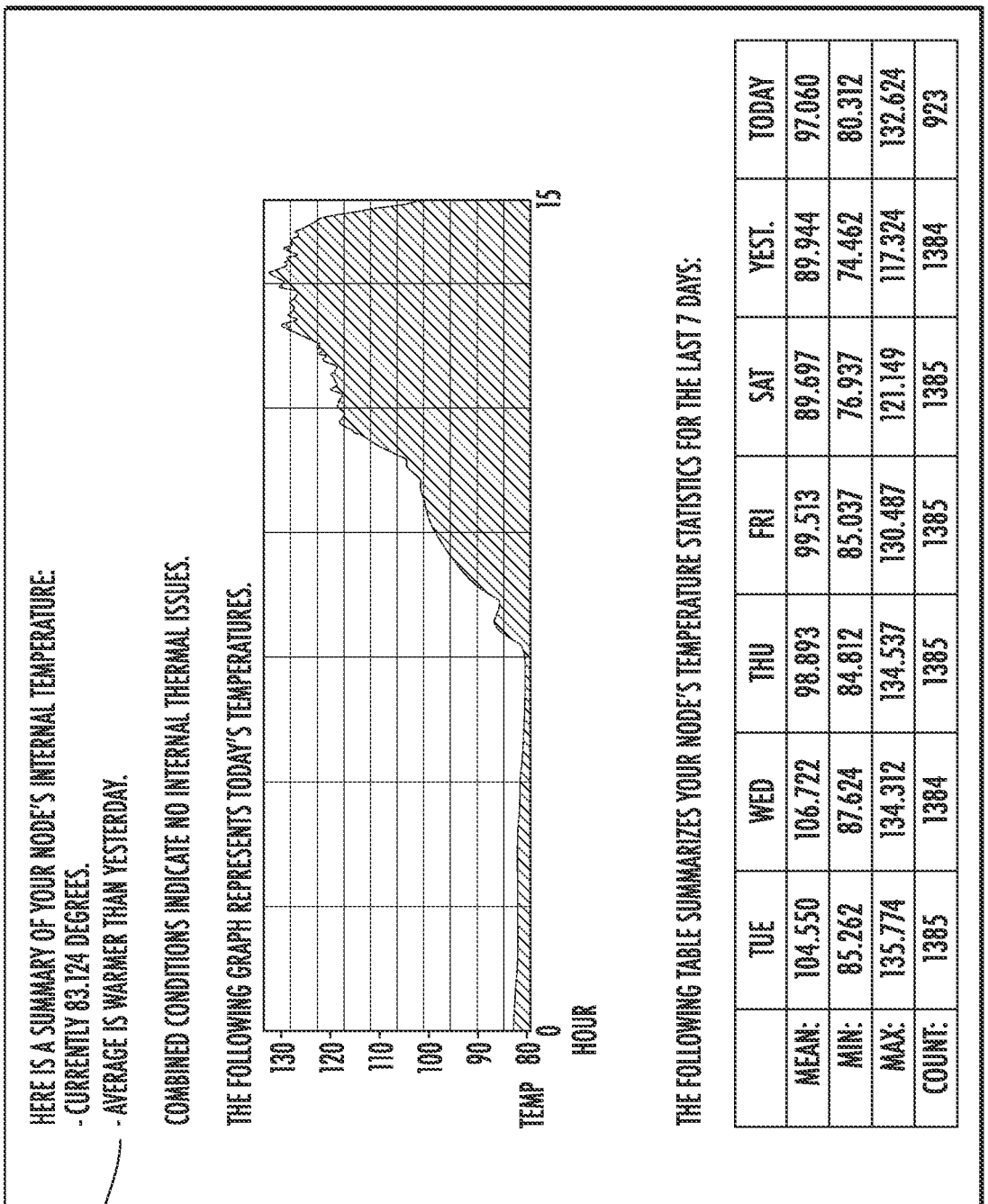
FIG. 7 is a screenshot of a typical report generated for the GUI of an electronic device that is configured to communicate with a node, according to embodiments of the present inventive concepts.

FIG. 7 is a screenshot of a report generated for display by a GUI of an electronic device 16 (FIG. 1C) that is configured to communicate with a node 10 (FIG. 2A). As shown in FIG. 7, the electronic device 16 may receive an email report 710 from the node 10. In particular, the report 710 that is shown in FIG. 7 summarizes internal temperature data for a node 10 that is a kiosk. The report 710 may be automatically generated by the node 10 on a regular (e.g., daily) basis. The report 710 may indicate, for example, a current internal temperature of the node 10 (e.g., a display) at the time the report 710 is generated by the node 10. Moreover, a real-time alert may be sent by the node 10 when an internal kiosk temperature meets or exceeds 140 degrees Fahrenheit. Once the temperature reaches 140 degrees Fahrenheit, all subsequent alerts (e.g., all subsequent wireless RF transmissions) by the node 10 may be stopped until the temperature decreases to an all-clear temperature of 135 degrees Fahrenheit.

In some embodiments, internal temperatures of the node 10 may be calculated by sampling hundreds (e.g., 600) of temperature reads and selecting the median temperature (to eliminate standard deviation fluctuations). The median value may then be logged into a database.

The "COUNT" that is shown in FIG. 7 indicates the total number of internal temperature reads for a particular node 10 (or a particular channel) during a particular day. The internal temperature of a node 10 (e.g., a digital banner or kiosk) may be calculated by directly measuring the temperature of one or more components that are inside the node 10 (rather than by measuring the air temperature inside the node 10). To reduce the impact of errant/outlier temperature reads (e.g., beyond three standard deviations), the median value of a sample of internal temperature reads may be provided.

Data from the node 10 may be captured by a centralized microprocessor (e.g., a processor P (FIG. 2A) in the node 10), which may include multiple channels of/for temperature, humidity, sound levels, air quality, and/or image processing. This microprocessor can store the reads (e.g., to produce a histogram) and can send alerts if any readings exceed a critical-factor threshold.

Moreover, the node 10 may include wireless sensors having their own (e.g., built-in) microprocessors that can read various characteristics (e.g., temperature, air quality, etc.) and pass those readings onto the centralized microprocessor. For example, if a kiosk is installed at a location near a bus stop, the air quality may appear artificially poor because of the exhaust fumes of a waiting bus. Accordingly, a small satellite air quality sensor may be added, for example, 100 feet away that is not influenced by the bus fumes. This little sensor can send (e.g., via a wireless network) its readings to the centralized microprocessor in the kiosk.

Furthermore, in some embodiments, a component of the node 10 may be able to publish its own sensor data (e.g., independently of the centralized microprocessor). A system according to the present invention can accommodate (e.g., receive data from) such a component.

Systems and methods of nodes 10 that include sensors S according to embodiments of the present inventive concepts may provide a number of advantages. These advantages include a high level of ease-of-use, due to the accessibility of processed sensor S data from multiple nodes 10 via one web portal (e.g., website). Moreover, new customer solutions and value propositions may result from intelligence provided by a sensor platform rather than just a random collection of sensors in the same housing or physical location. For example, data from cameras and environmental sensors can drive additional value for municipalities, in the form of enhanced information, services, and citizen safety. The data can also be valuable for electric utilities and advertisers, in the form of decreased energy usage during peak demand periods, dissemination of important information, as well as increased advertising or new monthly subscription programs resulting from nodes on light poles, digital banners, digital kiosks, utility poles, and/or mass-transit vehicles.

In embodiments in which optical sensors C are used to detect available parking spots, the number of optical sensors C may be reduced relative to conventional parking solutions that install a sensor at each parking spot. For example, a relatively small number of cameras may be used to inspect for vacancies. As an example, the cameras may be omnidirectional (i.e., 360-degree) cameras or other cameras that capture panoramic views. As each camera may target multiple parking spots, the total number of cameras may be smaller than the aggregate number of parking spots targeted by the group of cameras, thus resulting in a significant cost reduction. Additionally, the system may provide video data (among other sensor S data) that can be analyzed by nodes 10 for various objects such as people and motor vehicles.

The nodes 10 may be deployed in a geographic area 13 (FIG. 1A) to facilitate a smart city, a smart campus, or a smart community. Smart city and smart campus applications may include using data from sensors S in/on digital banners and/or digital kiosks. For example, the nodes 10 can count pedestrians, improve vehicle traffic control, measure air quality, and/or measure noise. On campuses, the nodes 10 can count students and/or enhance student safety. Moreover, smart community applications may include deploying the nodes 10 in residential neighborhoods or other public or private developments.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of present inventive concepts.

Example embodiments of the present inventive concepts may be embodied as nodes, devices, apparatuses, and methods. Accordingly, example embodiments of present inventive concepts may be embodied in hardware and/or in software (including firmware, resident software, microcode, etc.). Furthermore, example embodiments of present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create/use circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

That which is claimed is:

1. A system comprising:
a first outdoor node comprising a first digital display, a first processor, and a first plurality of sensors; and
a second outdoor node comprising a second digital display, a second processor, and a second plurality of sensors,
wherein the first and second outdoor nodes are at different first and second outdoor locations, respectively, in a geographic area,
wherein the first processor is configured to:
process first data from the first plurality of sensors;
control the first digital display in response to the processed first data; and
control uploading of the processed first data,
wherein the second processor is configured to:
process second data from the second plurality of sensors;
control the second digital display in response to the processed second data; and
control uploading of the processed second data, and
wherein processing first data comprises:
counting an object detected by the first plurality of sensors; and
refraining from re-counting the object for a predetermined amount of time.

2. The system of claim 1, wherein the first plurality of sensors comprise a camera, a microphone, a thermometer, a humidity sensor, and an air-pollution sensor.

3. The system of claim 1, wherein the object comprises a person.

4. A method of operating first and second nodes that are in a system of nodes, the method comprising:
processing first data from a first plurality of sensors of the first node;
controlling a first digital display of the first node in response to the processed first data;
uploading the processed first data from the first node;
processing second data from a second plurality of sensors of the second node;
controlling a second digital display of the second node in response to the processed second data; and
uploading the processed second data from the second node,
wherein the first node is attached to a first utility pole, a first light pole, a first digital banner, a first kiosk, or a first mass-transit vehicle,
wherein the second node is attached to a second utility pole, a second light pole, a second digital banner, a second kiosk, or a second mass-transit vehicle, and
wherein controlling the first digital display comprises:
identifying, via the first digital display, a plurality of parking spots that are adjacent the first node; and
changing digital information displayed by the first digital display, in response to identifying the parking spots.

5. The method of claim 4,
wherein the processed first data comprises a count of a plurality of objects detected by the first plurality of sensors, and
wherein the processed second data comprises a count of a plurality of objects detected by the second plurality of sensors.

6. The method of claim 5, wherein the count of objects detected by the first plurality of sensors comprises a count of pedestrians that are adjacent the first node.

7. The method of claim 5, wherein the count of objects detected by the second plurality of sensors comprises a count of motor vehicles that are adjacent the second node.

8. The method of claim 5, wherein the count of objects detected by the first plurality of sensors comprises a count of human faces that look at the first digital display.

9. The method of claim 4, wherein the first plurality of sensors comprises multiple types of sensors.

10. The method of claim 4, wherein the first plurality of sensors comprises a camera and a microphone.

11. The method of claim 10, wherein the first plurality of sensors further comprises an atmospheric pollution sensor or other weather sensor.

12. The method of claim 4, further comprising controlling a traffic light and/or a pedestrian crosswalk signal, in response to the processed first data.

13. The method of claim 4,
wherein the first plurality of sensors comprises a microphone, and
wherein uploading the processed first data is performed in response to detecting, by the microphone, a noise level that exceeds a threshold noise level.

14. The method of claim 4,
wherein the first plurality of sensors comprises a microphone, and
wherein uploading the processed first data is performed in response to detecting, by the microphone, a gunshot or a motor vehicle collision.

15. The method of claim 4, wherein the processed first data comprises an indication that passersby on scooters, bicycles, skateboards, and/or hoverboards have been detected by the first node.

16. The method of claim 4, further comprising:
receiving the processed first data at the second node via a wireless communications network; and
controlling the second digital display of the second node in response to the processed first data.

17. A method of operating first and second nodes that are in a system of nodes, the method comprising:
processing first data from a first plurality of sensors of the first node, wherein the first plurality of sensors comprises a microphone;
uploading the processed first data from the first node, wherein uploading the processed first data is performed in response to detecting, by the microphone:
a noise level that exceeds a threshold noise level; or
a gunshot or a motor vehicle collision;
processing second data from a second plurality of sensors of the second node; and
uploading the processed second data from the second node,
wherein the first node is attached to a first utility pole, a first light pole, a first digital banner, a first kiosk, or a first mass-transit vehicle, and
wherein the second node is attached to a second utility pole, a second light pole, a second digital banner, a second kiosk, or a second mass-transit vehicle.

18. The method of claim 17, wherein the first plurality of sensors comprises multiple types of sensors.

19. The method of claim 18, wherein the first plurality of sensors further comprises a camera.

20. The method of claim 19, wherein the first plurality of sensors further comprises an atmospheric pollution sensor or other weather sensor.

* * * * *